United States Patent Office 2,759,977
Patented Aug. 21, 1956

2,759,977
ALKYLENE DIOXY BIS-BENZYLAMINES

Koert Gerzon and Edwin R. Shepard, Indianapolis, Ind., assignors to Eli Lilly and Company, Indianapolis, Ind., a corporation of Indiana No Drawing. Application March 25, 1953,
Serial No. 344,668

6 Claims. (Cl. 260—570.9)

This invention relates to substituted alkanes and more particularly to α,ω-bis-(oxybenzyldialkylamino) substituted alkanes, their acid addition salts and the processes for their preparation.

The bases of the compounds of the invention can be represented by the formula

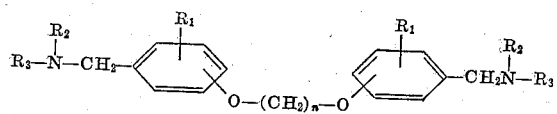

wherein each $R_1$ represents hydrogen or a lower alkoxy radical, each $R_2$ represents a lower alkyl radical, each $R_3$ repersents an alkyl radical having from three to ten carbon atoms, and $n$ represents an integer from 2 to 6. The bases are solids which are insoluble in water and soluble in most common organic solvents. The acid addition salts such as the mineral acid salts of the bases are generally somewhat water-soluble but as a rule are substantially insoluble in the typical organic solvents.

The new α,ω-substituted alkanes and their acid addition salts are amebicides and when administered orally or parenterally alone or in combination with pharmaceutical extending media are useful for veterinary and human administration to bring about the control or cure of amebic infections.

Broadly speaking, the new compounds are prepared by condensing a suitably substituted 1,2-bis-(4'-formylphenoxy) alkane with a primary alkylamine to form an intermediate double Schiff's base which is usually not isolated, but is reduced with hydrogen in the presence of a suitable catalyst to form the corresponding secondary alkylaminomethyl substituted bis-phenoxyalkane. The substituted bis-(alkylaminomethylphenoxy) alkane is alkylated to form the desired di-tertiary amine. The following series of equations illustrating the preparation of 1,2-ethane bis-(4'-oxybenzyl-methyl-n-butylamine) will serve to show the course of the reactions.

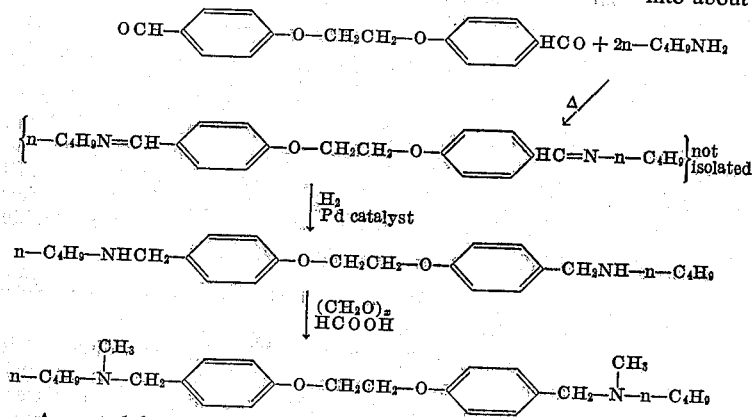

As noted hereinabove, the α,ω-substituted alkanes of the invention contain two basic nitrogen atoms which can form acid addition salts with inorganic and organic acids. Examples of the inorganic acids suitable for the preparation of these acid addition salts are the common mineral acids, e. g. hydrochloric, nitric, sulfuric, and phosphoric acids; examples of organic acids capable of forming acid addition salts with the bases of the invention are acetic, propionic, tartaric, benzoic, salicylic, maleic and the like acids. The acid addition salts of the novel bases of the invention are readily prepared by methods known to the art, as for example, by interreaction of stoichiometrically equivalent amounts of the selected base and an acid in mutual inert solvent solution. The preferred acid addition salts are the pharmaceutically useful salts, i. e., those salts which are not materially more toxic than the bases from which they are derived and which are suitable for incorporation into various pharmaceutical preparations useful for therapeutic application.

The following examples show the preparation and physical properties of illustrative compounds of this invention.

EXAMPLE 1

*1,2-ethane bis-(4'-oxybenzyl-methyl-n-hexylamine) dihydrochloride*

To a suspension of 27 g. (0.1 mol.) of ethylene glycol bis-(4-formylphenyl) ether, prepared according to the method of Neish, Rec. Trav. Chim. Pays-Bas, 66, 433, (1947), in 200 ml. of ethanol were cautiously added 2 g. of 5 percent palladium on charcoal. The mixture was heated on a steam bath to about 60°C. for about ten minutes. To the hot mixture were added 20.2 g. (0.2 mol.) of hexylamine, and the mixture containing the intermediate double Schiff's base was hydrogenated using an Adams apparatus, with the aid of a heat lamp. After completion of the hydrogenation, the reaction mixture was filtered while hot. On cooling, the 1,2-ethane bis-(4'-oxybenzyl-n-hexylamine) formed in the reaction crystallized, was removed by filtration and dried in a vacuum desiccator.

The 1,2-ethane bis-(4'-oxybenzyl-n-hexylamine) thus prepared melted at about 95–99° C., and was pure enough for the subsequent reaction steps.

To a well stirred ice-cooled mixture of 20 ml. of 37 percent aqueous formaldehyde solution and 45 ml. of 90 percent formic acid were added 33 g. (0.075 mol.) of powdered 1,2-ethane bis-(4'-oxybenzyl-n-hexylamine) in small portions. After the addition of the diamine was completed, the solution was heated for one-half hour on a steam bath and finally for two hours at refluxing temperature. The reaction mixture was cooled, and poured into about 200 ml. of ice water with stirring. The water solution was made alkaline by the addition of about 100 ml. of iced 20 percent aqueous sodium hydroxide, with stirring. The resulting precipitate, consisting of 1,2- ethane bis-(4'-oxybenzyl-methyl-n-hexylamine) formed in the reaction, was removed by filtration and dried over postassium hydroxide in a desiccator. The dry material was recrystallized by dissolving it in warm Skellysolve B (a commercial petroleum ether), filtering and cooling to about 0° C.

1,2-ethane bis-(4'-oxybenzyl-methyl-n-hexylamine) thus prepared melted at about 61–62° C.

Analysis.—Calculated for $C_{30}H_{48}N_2O_2$: N, 5.96. Found: N, 5.98.

Dry hyrogen chloride gas was passed through a solution of 9.4 g. of 1,2-ethane bis-(4'-oxybenzyl-methyl-n-hexylamine) in 100 ml. of acetone until 1.5 g. of hydrogen chloride had been absorbed. The acetone solution was cooled in ice, and the precipitate, comprising the dihydrochloride salt of 1,2-ethane bis-(4'-oxybenzyl-methyl-n-hexylamine) was removed by filtration and recrystallized from a mixture of ethanol and ether.

1,2-ethane bis-(4'-oxybenzyl-methyl-n-hexylamine) dihydrochloride thus prepared melted at about 210–211° C.

Analysis.—Calculated for $C_{30}H_{48}N_2O_2 \cdot 2HCl$: C, 66.54; H, 9.38; Cl, 13.09. Found: C, 66.57; H, 9.53; Cl, 13.33.

EXAMPLE 2

1,3-propane bis-(4'-oxybenzyl-methyl-n-hexylamine) dihydrochloride

To a suspension of 14.2 g. of trimethylene glycol bis-(4'-formylphenyl) ether, prepared according to the method of Neish, Rec. Trav. Chim. Pays-Bas, 66, 433, (1947), in 100 ml. of ethanol was cautiously added to 1 g. of 5 percent palladium on charcoal. The suspension was heated on a steam bath to about 60° C. for about ten minutes, and 10.1 g. of n-hexylamine were added to the warm suspension. The mixture was hydrogenated in an Adams apparatus, and the solution was filtered hot to remove the catalyst. On cooling, the 1,3-propane bis-(4'-oxybenzyl-n-hexylamine) formed in the reaction crystallized out, and was removed by filtration and recrystallized from ethanol solution. The 1,3-propane bis-(4'-oxybenzyl-n-hexylamine) thus prepared was methylated using formaldehyde and formic acid according to the procedure in Example 1. The 1,3-propane bis-(4'-oxybenzyl-methyl-n-hexylamine) which formed was removed from the reaction mixture by filtration and dried. 1,3-propane bis-(4'-oxybenzyl-methyl-n-hexylamine) thus prepared is a low-melting solid.

The 1,3-propane bis-(4'-oxybenzyl-methyl-n-hexylamine) was converted to its dihydrochloride salt by the same process as set forth in Example 1. 1,3-propane bis-(4'-oxybenzyl-methyl-n-hexylamine) dihydrochloride thus prepared melted at about 171–172° C.

Analysis.—Calculated for $C_{31}H_{50}N_2O_2 \cdot 2HCl$: C, 66.97; H, 9.43; Cl, 12.76. Found: C, 66.80; H, 9.49; Cl. 12.70.

EXAMPLE 3

1,2-ethane bis-(4'-oxybenzyl-methyl-n-heptylamine) dihydrochloride

The procedure of Example 1 was followed using 13.5 g. of ethylene glycol bis-(4'-formylphenyl) ether and 11.5 g. of n-heptylamine. After hydrogenation, the 1,2-ethane bis-(4'-oxybenzyl-n-heptylamine) obtained was recrystallized from ethanol, and melted at about 93–94° C.

Anaylsis. — Calculated for $C_{30}H_{48}N_2O_2$: N, 5.97. Found: 5.78.

Methylation of 1,2-(4'-oxybenzyl-n-heptylamine) with formic acid-formaldehyde mixture according to the procedure of Example 1 produced 1,2-ethane bis-(4'-oxybenzyl-methyl-n-heptylamine), which after recrystallization from ether melted at about 49–50° C.

Analysis. — Calculated for $C_{32}H_{52}N_2O_2$: N, 5.64. Found: N, 5.80.

10 g. of 1,2-ethane bis-(4'-oxybenzyl-methyl-n-heptylamine) were dissolved in 200 ml. of anhydrous ether and dry hydrogen chloride gas was passed through the ether solution until no further precipitate occurred. The dihydrochloride salt of 1,2-ethane bis-(4'-ozybenzyl-methyl-n-heptylamine) thus prepared melted at 217–218° C. after recrystallization from ethanol-ether mixture.

Analysis.—Calculated for $C_{32}H_{52}N_2O_2 \cdot 2HCl$: C, 67.47; H, 9.35. Found: C, 67.31; H, 9.58.

EXAMPLE 4

1,2-ethane bis-(4'-oxy-3'-methoxybenzyl-methyl-n-hexylamine)

A mixture of 123.5 g. of ethylene bromide, 220 g. of vanillin, 500 ml. of water and 500 ml. of methylcellosolve was brought to refluxing while stirring, and a solution of 52.5 g. of sodium hydroxide in 250 ml. of water was added in the course of about one hour. Refluxing and stirring were continued for about four hours, and the reaction mixture was cooled, whereupon a precipitate of 1,2-bis-(4'-formyl-2'methoxyphenoxy) ethane formed, and was filtered off, washed with water and dried. Upon recrystallization from methylcellosolve, 1,2-bis-(4'-formyl-2'-methoxyphenoxy) ethane melted at about 186–187° C.

A solution of 16.1 g. of 1,2-bis-(4'-formyl-2'-methoxyphenoxy) ethane and 10.1 g. of n-hexylamine in 200 ml. of boiling ethanol was refluxed for about one-half hour and filtered while hot. On cooling, the double Schiff's base formed in the reaction crystallized and was removed by filtration. On recrystallization from ethanol the double Schiff's base melted at about 93–94° C.

Analysis. — Calculated for $C_{30}H_{44}N_2O_4$: N, 5.63. Found: N, 5.26.

To a solution of 20 g. of the double Schiff's base in 200 ml. of ethanol were added 2 g. of 5 percent palladium on charcoal. The mixture was hydrogenated in an Adams apparatus with the aid of an infrared heating lamp. The reaction mixture was filtered hot to remove the catalyst, and on cooling, the 1,2-ethane bis-(4'-oxy-3'-methoxybenzyl-n-hexylamine) formed in the reaction crystallized and was removed by filtration. After recrystallization from a mixture of ethyl acetate and petroleum ether, the 1,2-ethane bis-(4'-oxy-3'-methoxybenzyl-n-hexylamine) melted at about 73–75° C.

Analysis. — Calculated for $C_{30}H_{48}N_2O_4$: N, 5.59. Found: N, 5.34.

The 1,2-ethane bis-(4'-oxy-3'-methoxybenzyl-n-hexylamine) was methylated using aqueous formaldehyde and formic acid according to the procedure of Example 1. The 1,2-ethane bis-(4'-oxy-3'-methoxybenzyl-methyl-n-hexylamine) thus prepared melted at about 61–62° C.

The dihydrochloride salt of 1,2-bis-(4'-oxy-3'-methoxybenzyl-methyl-n-hexylamine) was prepared according to the procedure set forth in Example 1. After recrystallization from acetone the 1,2-bis-(4'-oxy-3'-methoxybenzyl-methyl-n-hexylamine) dihydrochloride-monohydrate thus prepared melted at about 222–224° C.

Analysis.—Calculated for $C_{32}H_{52}N_2O_4 \cdot 2HCl \cdot H_2O$: C, 62.10; H, 9.05; Cl, 11.45. Found: C, 62.00; H, 9.03; Cl, 11.61.

EXAMPLE 5

1,2-ethane bis-(4'-oxybenzyl-methyl-2''-n-heptylamine)

A mixture of 13.5 g. of ethylene glycol bis-(4-formylphenyl ether), 11.5 g. of 2-aminoheptane and 200 ml. of ethanol was refluxed for about one-half hour and filtered hot. On cooling, the intermediate double Schiff's base crystallized and was removed by filtration. After recrystallization from petroleum ether, the double Schiff's base melted at about 96–98° C.

Analysis.—Calculated for: $C_{30}H_{44}N_2O_2$: N, 6.04. Found: N, 6.04.

The intermediate double Schiff's base was dissolved in about 150 ml. of ethanol and 2 g. of 5 percent palladium on charcoal catalyst were added. The mixture was hydrogenated in an Adams apparatus. The reaction mixture was filtered to remove the catalyst and on cooling, the 1,2-ethane bis-(4'-oxybenzyl-2''-n-heptylamine) formed crystallized and was removed by filtration. On recrystallization from petroleum ether, 1,2-ethane bis-(4'-oxybenzyl-2"-n-heptylamine) melted at about 58–60° C.

*Analysis.*—Calculated for $C_{30}H_{48}N_2O_2$: N, 5.96. Found: N, 5.93.

The 1,2-ethane bis-(4'-oxybenzyl-2"-n-heptylamine) was methylated by means of formaldehyde and formic acid according to the procedure described in Example 1. After recrystallization from petroleum ether, the 1,2-ethane bis-(4'-oxybenzyl-methyl-2"-n-heptylamine) thus prepared melted at about 36–37° C.

*Analysis.*—Calculated for $C_{32}H_{52}N_2O_2$: N, 5.64. Found: N, 5.74.

The dihydrochloride salt of 1,2-ethane bis-(4'-oxybenzyl-methyl-2"-n-heptylamine) was prepared according to the procedure of Example 1.

EXAMPLE 6

1,2-ethane bis-(4'-oxybenzyl-methyl-n-hexylamine) sulfate.

To a solution of 4.68 g. (0.01 mol.) of 1,2-ethane bis-(4'-oxybenzyl-methyl-n-hexylamine) prepared according to the procedure of Example 1, in 50 ml. of cellosolve are added 10 ml. of M/1 $H_2SO_4$. The solution is thoroughly stirred, and evaporated to dryness in vacuo.

The residue from evaporation is 1,2-ethane bis-(4'-oxybenzyl-methyl-n-hexylamine) sulfate.

Similarly, the nitric, acetic, propionic and benzoic acid addition salts of 1,2-ethane bis-(4'-oxybenzyl-methyl-n-hexylamine) are prepared by the addition of stoichiometrically equivalent amounts of nitric, acetic, propionic and benzoic acids to a solution of 1,2-ethane bis-(4'-oxybenxyl-methyl-n-hexylamine) followed by evaporation of the solvent.

1,3-propane bis-(4'-oxybenzyl-methyl-n-hexylamine), 1,2-ethane bis-(4'-oxybenzyl-methyl-n-heptylamine), 1,2-ethane bis-(3'-methoxy-4'-oxybenzyl - methyl - n - hexyl - amine) and 1,2-ethane bis-(4'-oxybenzyl-methyl-2"-n-heptylamine) are substituted for 1,2-ethane bis-(4'-oxybenzyl-methyl-n-hexylamine) in the forgoing procedures. The sulfate, dinitrate, diacetate, dipropionate, and dibenzoate salts of the named compounds, respectively, are obtained.

EXAMPLE 7

The procedure of Example 1 was followed except that n-butylamine was used instead of n-hexylamine.

1,2-ethane bis-(4'-oxybenzyl-methyl-n-butylamine) thus prepared melted at about 52–53° C.

*Analysis.*—Calculated for $C_{26}H_{40}N_2O_2$: N, 6.79. Found: N, 6.48.

EXAMPLE 8

The procedure of Example 1 was followed, except that n-pentylamine was used instead of n-hexylamine.

1,2-ethane bis-(4'-oxybenzyl-methyl - n - pentylamine) thus prepared melted at about 52–53° C.

*Analysis.*—Calculated for $C_{28}H_{44}N_2O_2$: N, 6.36. Found: N, 6.15.

The dihydrochloride salt of 1,2-ethane bis-(4'-oxybenzyl-methyl-n-pentylamine) melted at about 212–213° C.

*Analysis.*—Calculated for $C_{28}H_{44}N_2O_2 \cdot 2HCl$: C, 65.48; H, 9.03. Found: C, 65.60; H, 9.11.

EXAMPLE 9

The procedure of Example 1 was followed except that n-octylamine was used instead of n-hexylamine.

The dihydrochloride salt of 1,2-ethane bis-(4'-oxybenzyl-methyl-n-octylamine) melted at about 214–215° C.

*Analysis.*—Calculated for $C_{34}H_{56}N_2O_2 \cdot 2HCl$: N, 4.69. Found: N, 4.72.

EXAMPLE 10

Example 1 was repeated, using n-decylamine instead of n-hexylamine.

1,2-ethane bis-(4'-oxybenzyl-methyl-n-decylamine) dihydrochloride thus prepared melted at about 223–224° C.

*Analysis.*—Calculated for $C_{38}H_{64}N_2O_2 \cdot 2HCl$: C, 69.80; H, 9.87. Found: C, 69.78; H, 10.03.

EXAMPLE 11

The method of Example 1 was carried out, using the corresponding quantity of 1,4-tetramethylene glycol bis-(4'-formylphenyl) ether, prepared according to the method of Neish, Rec. Trav. Chim. Pays-Bas, 66 433 (1947), instead of ethylene glycol bis-(4-formylphenyl) ether.

1,4-butane bis-(4'-oxybenzyl-methyl-n-hexylamine) thus prepared melted at about 49–50 ° C.

*Analysis.*—Calculated for $C_{32}H_{52}N_2O_2$: N, 5.65. Found: N, 5.83.

The dihydrochloride salt of 1,4-butane bis-(4'-oxybenzyl-methyl-n-hexylamine) melted at about 198–199° C.

*Analysis.*—Calculated for $C_{32}H_{52}N_2O_2 \cdot 2HCl$: C, 67.54; H, 9.52; Cl, 12.75. Found: C, 67.67; H, 9.25; Cl, 12.38.

We claim:

1. A member of the group consisting of a base and its acid addition salts, said base being represented by the formula:

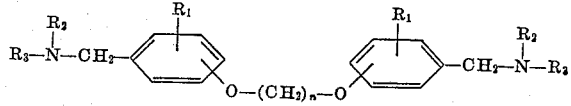

wherein $R_1$ represents a member of the group consisting of hydrogen and lower alkoxy radicals, $R_2$ represents a lower alkyl radical, $R_3$ represents a member of the group consisting of alkyl radicals having from 3 to 10 carbon atoms, and $n$ represents an integer from 2 to 6.

2. 1,2-ethane bis-(4'-oxybenzyl-methyl-n - hexylamine) represented by the formula:

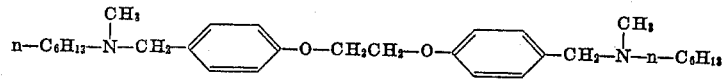

3. 1,3-propane bis-(4'-oxybenzyl-methyl-n-hexylamine) represented by the formula:

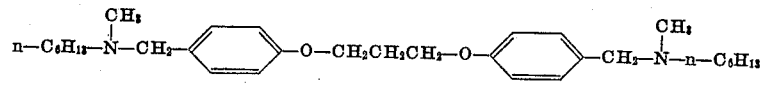

4. 1,2-ethane bis-(4'-oxybenzyl-methyl-n-heptylamine) represented by the formula:

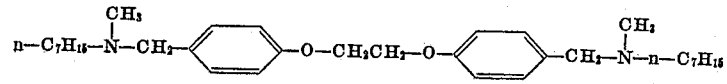

5. 1,2-ethane bis-(4'-oxy-3'-methoxybenzyl - methyl-n-hexylamine) represented by the formula:
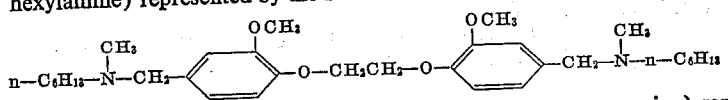
6. 1,2 - ethane bis-(4'-oxybenzyl-methyl-2''-n-heptylamine) represented by the formula:
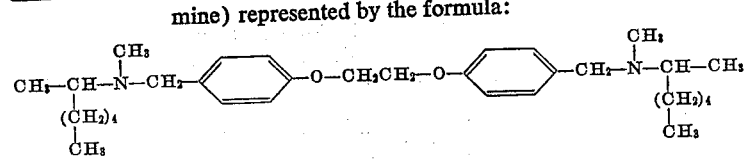
References Cited in the file of this patent
FOREIGN PATENTS
| | | |
|---|---|---|
| 104,522 | Sweden | May 19, 1942 |
| 223,161 | Switzerland | Nov. 16, 1942 |